United States Patent [19]
Ritola

[11] Patent Number: 6,048,164
[45] Date of Patent: Apr. 11, 2000

[54] STICKER PLACEMENT APPARATUS

[75] Inventor: Edward W. Ritola, LaCenter, Wash.

[73] Assignee: U.S. Natural Resources, Inc., Vancouver, Wash.

[21] Appl. No.: 09/277,625

[22] Filed: Mar. 26, 1999

[51] Int. Cl.[7] .................................................. B65G 57/26
[52] U.S. Cl. ................................... 414/789.5; 414/793.4; 414/794.3; 414/794.1
[58] Field of Search .............................. 414/789.5, 794.3, 414/793.4, 794, 794.1

[56] References Cited

U.S. PATENT DOCUMENTS

| 3,904,044 | 9/1975 | Lunden . | |
|---|---|---|---|
| 4,253,787 | 3/1981 | Lunden . | |
| 4,324,521 | 4/1982 | Lunden . | |
| 4,810,152 | 3/1989 | Gillingham | 414/789.5 |
| 5,720,592 | 2/1998 | Gillingham | 414/789.5 |

Primary Examiner—Douglas Hess
Attorney, Agent, or Firm—Robert L. Harrington

[57] ABSTRACT

A sticker placement apparatus of a lumber stacking machine for placing stickers in the pans of stacking forks without the need of stopping movement of the forks. A transfer mechanism elevates a sticker off a sticker conveyor as the forks are moving a tier of lumber pieces outwardly onto a lumber stack. The transfer mechanism has cradles that elevate the stickers to a position strategic to the forks as the forks are elevated to engage the next tier of lumber pieces. The stickers are transferred to the pans without stopping movement of the forks.

5 Claims, 4 Drawing Sheets ns and accordingly the invention will be more clearly
STICKER PLACEMENT APPARATUS

FIELD OF THE INVENTION

This invention relates to lumber stacking and more particularly to the placement of stickers between layers of lumber in a stack for spacing the layers to provide drying of the lumber.

BACKGROUND OF THE INVENTION

The process of lumber stacking involves a stacker, a conveyor conveying lumber pieces, e.g., 8' to 12' long and 2"×4" in cross section, to the stacker where the pieces are accumulated into layers, e.g., twelve 2"×4" pieces making up a layer and stacking the layers one on top of the other but separated by stickers. The stickers are laid perpendicular to the length of the lumber pieces at, e.g., 2' intervals. The stickers separate the layers by about 1"–2" to allow air flow above and below the layers (and between the spaced apart stickers).

Speed is of the essence and whereas the lumber can be accumulated and stacked in layers very rapidly, the bottleneck has long been considered the placement of the stickers between the layers. One form of the lumber stacking apparatus used for placing the stickers between layers provides a sticker holding pan attached alongside the forks of the stacker. As the forks receive a layer of lumber pieces and with the stickers residing in the sticker pan below the top side of the fork whereat the lumber is received, the layer is carried to the stack and as the layer is deposited on the stack, so too are the stickers deposited under the layer. This process is disclosed in U.S. Pat. Nos. 4,253,787 and 4,324,521, the disclosures of which are incorporated herein in their entirety.

As disclosed in these patents, the process of sticker placement involves cycling the forks back and forth between lumber receiving and stack depositing positions. Just prior to the step of lumber receiving and with the forks positioned below the next layer of lumber pieces, the fork movement is paused to allow time for the stickers to be picked off a sticker conveyor by a transfer mechanism and deposited into the pan. It is an object of the present invention to avoid the necessity of pausing the fork movement and with such avoidance, to shorten the stacking time and increase the rate of lumber stacking.

BRIEF DESCRIPTION OF THE INVENTION

In the prior apparatus, the transfer mechanism was mounted at a position below the sticker conveyor. The sticker conveyor moved the stickers into position with the entirety of the transfer mechanism positioned below the sticker conveyor. The conveyor was stopped and extension arms of the transfer mechanism proceeded to transfer the stickers from the conveyor to the sticker pan above the conveyor and then return to the position below the conveyor to await restart and stopping of the sticker conveyor before the process could be repeated.

In the preferred embodiment of the present invention, the transfer mechanism is mounted above the sticker conveyor and permits travel of the conveyor while the arms of the transfer mechanism are in the process of transferring the stickers to the sticker pan. The timing and arrangement of components are such that the arms of the transfer mechanism reach down between two succeeding spaced apart stickers as the conveyor is in motion. The conveyor is stopped with the trailing sticker positioned over sticker carrying cradles of the transfer arms. The arms are raised to position the cradles and sticker carried thereby, to an overhead transfer position below the next layer of lumber, all taking place while the fork is placing the preceding lumber layer on the stack. With the cradle and stickers in the overhead transfer position, the sticker forks are in the process of being retracted under the cradles. The forks uninterruptedly raise up under the stickers held in the transfer cradles and under the overlying layer of lumber pieces to repeat the stacking operation. As indicated above, the conveyor of the stickers is timed for movement of the next stickers into the transfer position as the empty cradles are dipped down between pairs of moving stickers for receiving the next series of stickers for positioning in the path of the stacking forks.

Various modifications have been made to the prior apparatus to achieve this objective of continuous stacking including the design of the transfer mechanism, the change in relative positioning of the sticker pan and fork, and the design and operation of the sticker conveyor. These modifications and accordingly the invention will be more clearly understood upon review of the following detailed description and the drawings referred to therein.

DESCRIPTION OF THE PREFERRED EMBODIMENT

Figure 1:
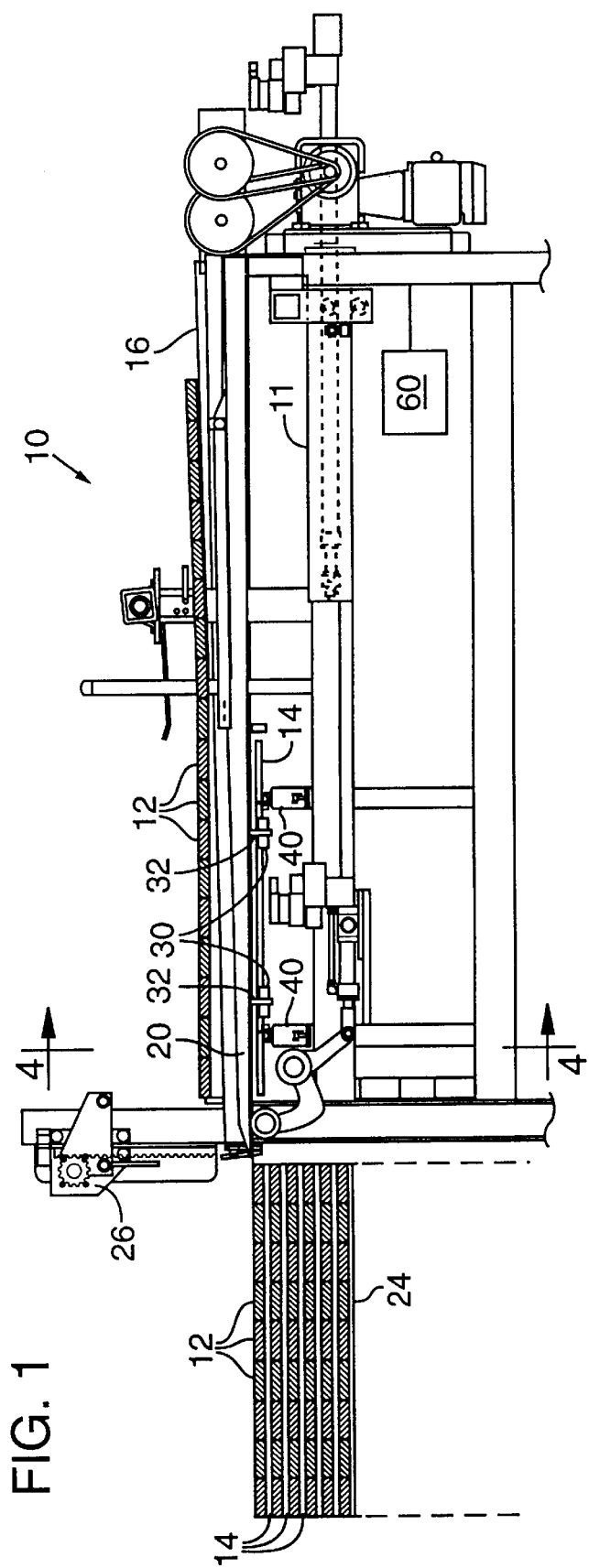
FIGS. 1, 2 and 3 are side views of a lumber stacker at different stages in the process of stacking lumber pieces.

FIG. 1 illustrates a lumber stacker 10 arranged to stack lumber pieces 12 in layers to form a stack 24. Each layer of lumber pieces 12 in the stack 24 is separated by stickers 14. The stickers 14 are placed transverse to the length of the lumber pieces 12 and are positioned at intervals along the length of the lumber pieces 12. The stickers 14 separate each layer of the lumber pieces 12 from another and provide an air gap between each layer on the stack 24.

A conveyor 16 conveys the lumber pieces 12 onto the stacker 10. The stacker 10 has forks 20 that are moved in a substantially rectangular pattern of movement through the different stages of stacking by a known mechanism 11.

Figure 2:
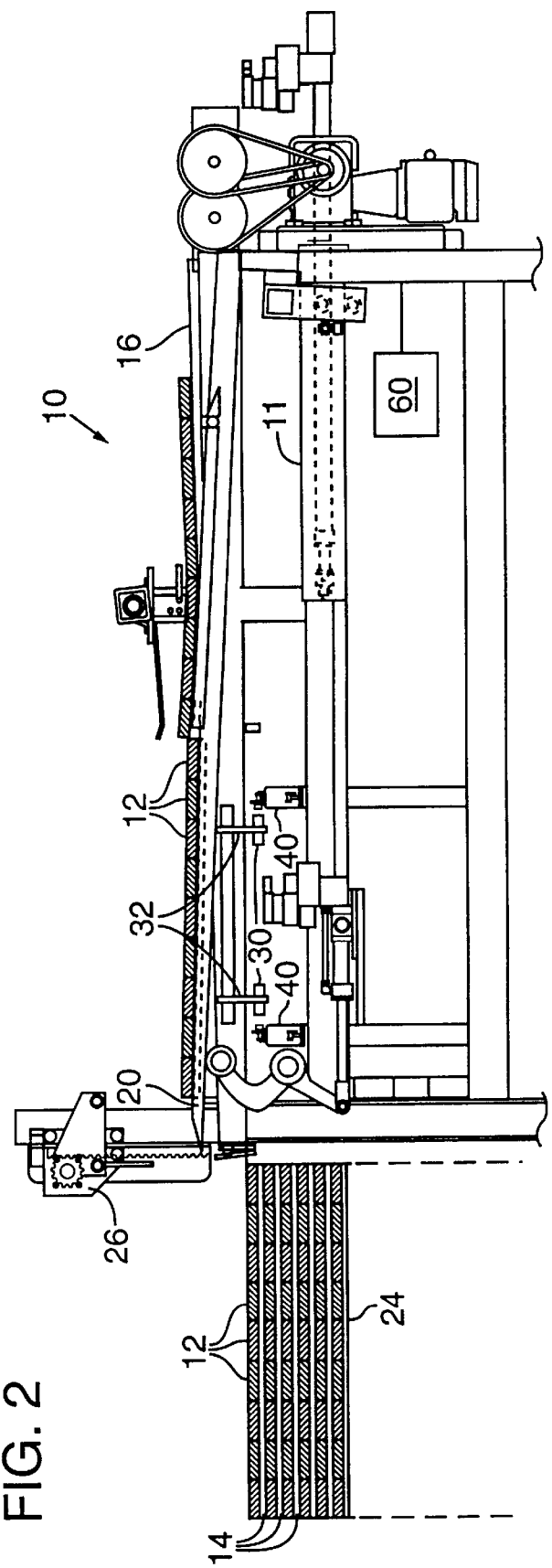

Only one fork 20 is shown in the side views of the figures but the reader will appreciate that at least two spaced apart forks 20 are required to lift and transfer the lumber pieces 12. The forks 20 are shown in FIG. 1 in a layer receiving position (hereafter referred to as the start position although as will be explained, the forks 20 cycle in a continuous operation). The forks 20 move vertically upwardly from the start position to engage a specific number of the lumber pieces 12 to elevate them from the conveyor 16 as shown in FIG. 2. As the forks 20 elevate from the start position, stickers 14 (FIG. 4) are received in sticker pans 22 which are provided on the side of the forks 20. The stickers 14 as received in the pans 22 will be positioned underneath the multiple lumber pieces 12 received on the forks 20 as shown in the dash line positions of FIG. 4.

Figure 3:
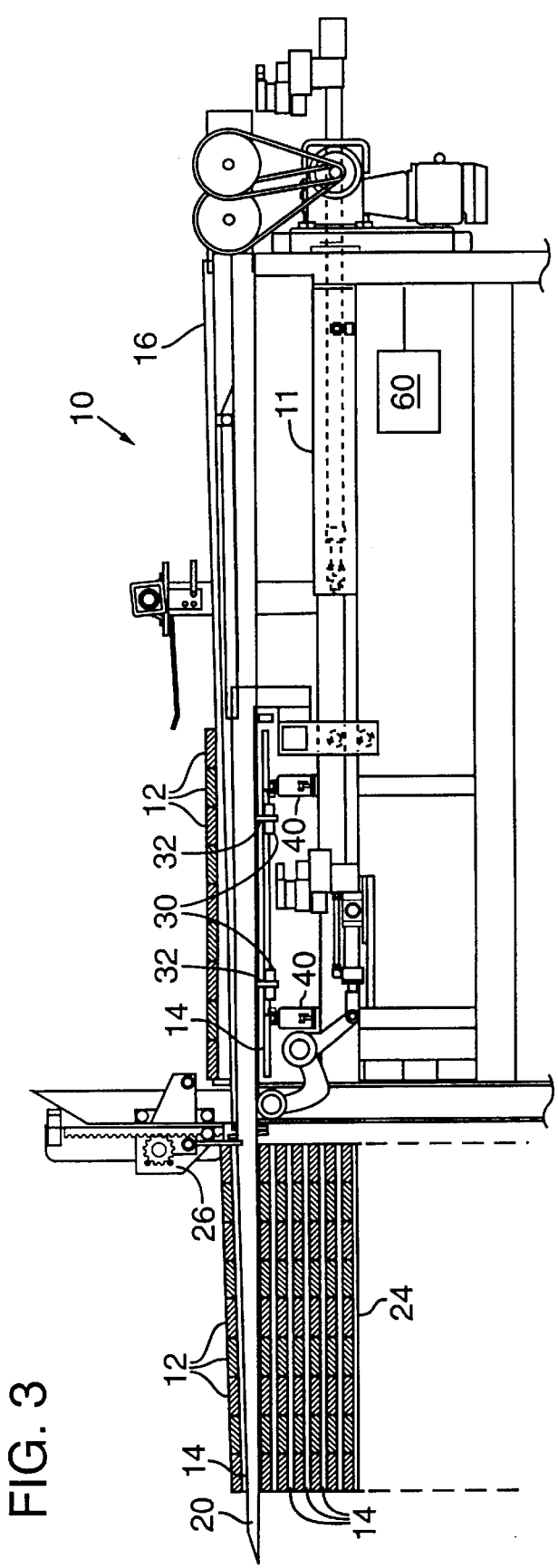

When elevated, the forks 20 move outwardly to a lumber depositing station to position the lumber pieces 12 and the stickers 14 above the stack 24 of lumber 12. The forks 20 as shown in FIG. 3 have been moved outwardly over the stack 24 and have been moved vertically downward preparatory to depositing the lumber pieces 12 on the stack 24. A stripper mechanism 26 descends as the forks 20 are lowered vertically downward. The forks 20 are retracted horizontally inward to the start position and the stripper mechanism 26 forces the lumber pieces 12 and the stickers 14 off the forks 20 and onto the stack 24.

Figure 4:
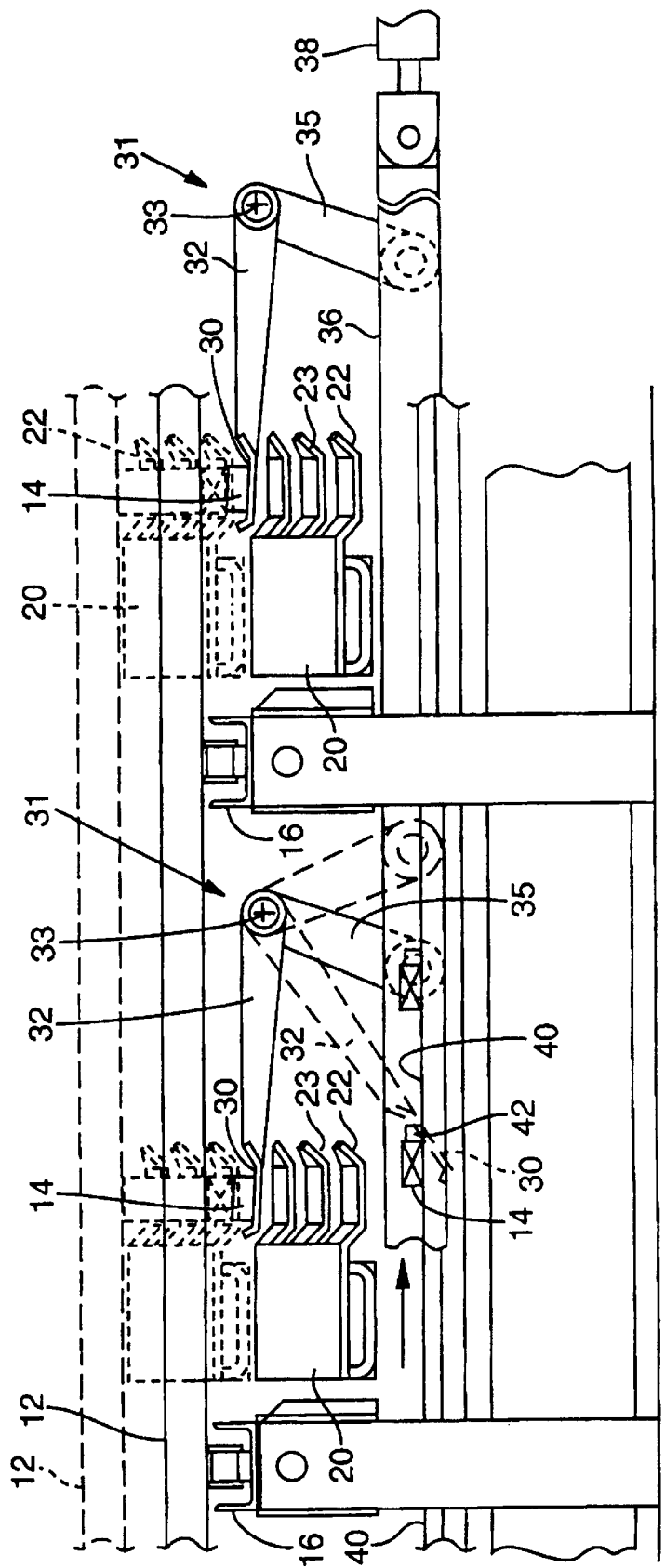
FIG. 4 is a view of a sticker transfer mechanism of the lumber stacker of FIGS. 1, 2 and 3 as if taken on view lines 4—4 of FIG. 1 but with the transfer mechanism at a still different position than illustrated in FIGS. 1, 2 and 3.

With reference now to FIG. 4, during the cycle time whereby the forks 20 are moving outwardly over the stack of lumber 24 and returning to the start position as illustrated in FIG. 1, a transfer mechanism 31 is transferring stickers 14 from a sticker conveyor 40 to a position where the stickers will be transferred onto the pans 22 of the forks 20. As shown in FIG. 4, each pan 22 is a plurality of segments spaced apart vertically and longitudinally. (The stickers lay in the pan at an angle to the tier of lumber which provides smoother action as known to the art.)

The transfer mechanism 31 includes a pair of pivot arms 32 that have a cradles 30 at their distal ends and are pivotally fixed to pivot 33. A crank arm 35 fixed at one end to pivot 33 and pivotally connected at the other end to shuttle bar 36 rotates pivot 33 and thereby pivots pivot arm 32 upwardly to lift a sticker from sticker conveyor 40 (see dash line position) to position the sticker 14 at the proper elevation for transferring the sticker 14 to the pan 22 of the fork 20 (see solid line position).

When the forks 20 have been retracted from the stack 24, the forks 20 move under the stickers 14 land under a waiting tier of lumber pieces 12) and then the forks are raised to receive the stickers 14 and then the lumber pieces 12 for a return trip to the stack. The pans 22 of the forks 20 have spaces 23 as noted above to permit pans 22 to pass upwardly through the cradles 30 and to allow the cradles 30 to pivot downwardly as the forks 20 are moved upwardly. The pivot arms 32 continue to pivot downwardly to be in position to pick up the next sticker 14 on the sticker conveyor 40.

Movement of the shuttle bar 36 produces pivoting of the crank arms 35 and thus the pivot arms 32 in unison. In this embodiment, the shuttle bar 36 is moved by a cylinder 38. It will be appreciated by those skilled in the art that the shuttle bar 36 may be mechanically coupled to the movement of the forks 20. Also, it will be appreciated that the arrangement of components allows the coordination of movements as between the forks 20, the conveyor 40 and the transfer mechanism. Thus the arms 32 are pivoted from a position above conveyor 40 and so that the arms 32 extend rearwardly from the pivot into the path of the conveyor movement. Such allows running of the conveyor 40 except as may be required for the cradles 30 to pick a sticker 14 off the conveyor 40 (and even such pick off of the stickers may be achieved without stopping the conveyor). Also, the pans 22 are on the side of the fork (the right side in FIG. 4) so that the pans can move under the cradles with the cradles in the raised position (solid line position in FIG. 4).

A control 60 is provided for controlling the stacker 10. The control 60 coordinates the movement of the pivot arms 32, the conveyors 16 and 40 and the forks 20. Also, the sticker conveyor 40 is of a known type that has a speed up mechanism to force the stickers 14 into abutment with restricting stops 42 on the conveyor 40 to properly align the stickers 14 for transfer by the cradles 30.

In Operation

It will be appreciated that the arrangement of components in FIG. 4 are essentially as viewed from view lines 4—4 as indicated in FIG. 1. As previously explained, the transfer of the cradles 30 from the solid line position to the dash line position and back to the solid line position in FIG. 4 occurs during the movement of the forks from the dash line position of FIG. 4 to the stack 24 and hack as explained previously for the sequence of FIGS. 1–3. With reference to FIG. 4 and considering that the forks 20 have raised into the upper dash line position thereby lifting the stickers off the cradles 30, the subsequent actuation of cylinder 38 is coordinated with movement of the stickers 14 on the conveyor 40. As the selected stickers 14 approach the pick off position, cylinder 38 is activated to draw shuttle bar 38 to the right as seen in FIG. 4. This pivots the arm 32 downwardly so that the cradle 30 dips down through the conveyor between stickers and the conveyor 40 is stopped or slowed in the dash line position indicated in FIG. 4, i.e., with the cradle directly under a selected sticker 14. The cylinder 38 is then reversed to push shuttle bar 36 to the left which pivots the cradle 30 and the selected sticker 14 to the transfer position as shown in solid lines.

The above-described movement of arms 32 and cradles 30 all occurs during the movement of the forks toward and from the stack. The return movement of the forks occurs at a lower level than when moved toward the stack. Recall that the movement of the forks 20 is upwardly for pick up of the lumber pieces and then forwardly in this upper level to a position over the stack, downwardly for depositing the lumber and stickers onto the stack and then rearwardly at the lower level. Thus the forks 20, and more particularly the pans 22 attached to the forks, are moved under the positioned stickers held by the cradles 30, as viewed in FIG. 4 in solid lines. The process is then repeated but it will be noted that the movement of the forks can be continuous.

Those skilled in the art will recognize that modifications and variations may be made without departing from the true spirit and scope of the invention. The invention is therefore not to be limited to the embodiments described and illustrated but is to be determined from the appended claims.

What is claimed is:

1. A sticker placement apparatus for a stacker wherein a plurality of stacking forks move in a substantially rectangular path, starting at a layer receiving station and moving vertically upward from a lower position to an upper position for receiving a layer of lumber and stickers, moving horizontally toward a layer depositing station over a lumber stack, moving vertically downward from the upper position to a lower position for depositing a layer of lumber pieces and stickers onto the stack, and then moving along a horizontal path at the lower position back to the layer receiving station, the sticker placement apparatus comprising:

a sticker holding pan positioned at the side of selected ones of the stacking forks for receiving stickers that are deposited on the stack along with the layer of lumber, the stickers thereby spacing the overlying lumber layers;

a sticker conveyor conveying stickers in spaced apart relation and in a direction perpendicular to the horizontal movement of the stacking forks and in a plane below the plane of the horizontal path of the stacking forks at the lower position;

a transfer mechanism, transfer arms and sticker cradles forming a part of the transfer mechanism, said transfer arms transporting said cradle between a first position below the stickers on the sticker conveyor and a second position above the sticker holding pans with the forks at the lowermost position prior to being raised under the layer of lumber, said transfer arms in said second position being out of the path of the stacker forks as the forks move back to the layer receiving station; and a control for controlling the movement of the sticker conveyor and the transfer arms relative to the stacker forks whereby said sticker cradles are projected below selected stickers being conveyed on the sticker conveyor, the sticker cradles picking up the selected stickers and transporting the stickers to an upper transfer position, all during movement of the stacker fork to and from the depositing station whereby the upwardly directed vertical movement of the forks transfers the stickers from the cradles into the sticker holding pan without interrupting the movement of the forks.

2. A sticker placement apparatus as defined in claim 1 wherein the transfer arms are pivotally connected to the stacker at one end and an opposite end forming the cradle, the pivotal connection provided above the sticker conveyor whereby with the cradle end raised above the sticker conveyor the sticker conveyor is free to convey stickers.

3. A sticker placement apparatus as defined in claim 2 wherein pivoting of the transfer arms around the pivotal connection is provided by a crank arm connected to the pivotal connection and an actuator controlling the pivotal action of the crank arm.

4. A sticker placement apparatus as defined in claim 1 wherein the transfer arms are structurally arranged in coordination with the stacking forks and sticker holding pans thereon whereby with the cradle and sticker therein in the second position, the forks can raise up through the cradle to receive the stickers without interruption of the fork movement.

5. A sticker placement apparatus as defined in claim 4 wherein the pan is comprised of spaced apart pan segments defining a spacing that allows passage of the cradles therethrough.

* * * * *